United States Patent
Ren et al.

(10) Patent No.: US 8,593,587 B2
(45) Date of Patent: Nov. 26, 2013

(54) MULTI-LEVEL LIGHT GUIDE PLATE AND LIQUID CRYSTAL DISPLAY MODULE

(75) Inventors: Jie Ren, Shenzhen (CN); Yicheng Kuo, Shenzhen (CN); Kuojun Fang, Shenzhen (CN)

(73) Assignee: Shenzhen China Star Optoelectronics Technology Co., Ltd., Guangdong (CN)

(*) Notice: Subject to any disclaimer, the term of this patent is extended or adjusted under 35 U.S.C. 154(b) by 27 days.

(21) Appl. No.: 13/220,281

(22) Filed: Aug. 29, 2011

(65) Prior Publication Data

US 2012/0133861 A1 May 31, 2012

Related U.S. Application Data

(63) Continuation of application No. PCT/CN2010/079150, filed on Nov. 26, 2010.

(30) Foreign Application Priority Data

Jul. 28, 2011 (CN) .......................... 2010 1 0239655

(51) Int. Cl.
   *G02F 1/13357* (2006.01)
(52) U.S. Cl.
   USPC ................................ 349/62; 349/65; 362/615
(58) Field of Classification Search
   None
   See application file for complete search history.

(56) References Cited

U.S. PATENT DOCUMENTS

| | | | | |
|---|---|---|---|---|
| 2008/0232136 A1* | 9/2008 | Yamashita et al. | ............ | 362/619 |
| 2009/0116261 A1* | 5/2009 | Chen et al. | ..................... | 362/609 |
| 2011/0051045 A1* | 3/2011 | Hur et al. | ........................ | 349/65 |
| 2011/0109843 A1* | 5/2011 | Jung | .............................. | 349/65 |

FOREIGN PATENT DOCUMENTS

| | | |
|---|---|---|
| CN | 1512240 | 7/2004 |
| CN | 101477271 A | 7/2009 |
| CN | 201363668 Y | 12/2009 |
| CN | 201502963 U | 6/2010 |
| CN | 201531825 U | 7/2010 |
| JP | 2009265254 A * | 11/2009 |
| WO | 2010038808 A1 | 4/2010 |

* cited by examiner

*Primary Examiner* — Thanh-Nhan P Nguyen
(74) *Attorney, Agent, or Firm* — Ditthavong, Mori & Steiner, P.C.

(57) ABSTRACT

The present invention discloses a multi-level light guide plate (LGP) and a liquid crystal display (LCD) module. The LGP is divided into multiple sections sequentially connected with each other in a direction, and at least one light bar is disposed at an outward side of each section of said multiple sections. The LCD module has the multi-level LGP, which is located between a liquid crystal panel and a back plate. The multi-level LGP provided by the present invention can achieve local dimming for multiple sections and ensure that light rays of the respective sections will not influence each other.

16 Claims, 4 Drawing Sheets

MULTI-LEVEL LIGHT GUIDE PLATE AND LIQUID CRYSTAL DISPLAY MODULE

TECHNICAL FIELD OF THE INVENTION

The present invention relates to a multi-level light guide plate and a liquid crystal display module, more particularly, to a liquid crystal display module, which effectively improves local dimming effect by using a novel structural design of the multi-level light guide plate, and is classified in the field of liquid crystal technique.

BACKGROUND OF THE INVENTION

Liquid crystal (LCD) is a material between liquid and crystal, the display principle is that different voltages are applied to the liquid crystals to change the state of the molecular arrangement, thereby controlling the through-put of light rays to display various images. The liquid crystal does not emit light per se. Instead, it controls allowing the light rays to pass through or not. Therefore, all liquid crystal display modules (LCD module) need backlight sources for illumination.

In the past, the backlight source used in the LCD module is mainly a cold cathode fluorescent lamp (CCFL). As the development of the liquid crystal technique, light emitting diodes (LEDs) start to be wildly used in the LED modules as the backlight sources. As the LED is used as the backlight source, power consumption can be significantly reduced, a contrast and gray-scale number of the displayed picture can be promoted, and a ghost shadow can be decreased. The technical superiority is quite evident.

Local dimming is a technique enabling the LCD module to achieve different degrees of luminance and lighting variance in different sections. It generally includes three types, which are respectively 0 dimensional (0D), 1 dimensional (1D) and 2 dimensional (2D) luminance control, and respectively correspond to the backlight sources including a flat light source (e.g. Flat Fluorescent; FFL and OLED), a CCFL (or an external electrode fluorescent lamp; EEFL similar to CCFL) and an LED.

Currently, LED is the best light source among the backlight sources to achieve the optimal control of the local dimming. This it because the light emitting manner of the flat light source is to lighten the whole plane or darken the whole plane, the backlight cannot be varied for small sections in various brightness. CCFL or EEFL is a line light source, and the speed of turning on and off is not fast enough. If the switching speed is driven forcibly, the lifetime of the CCFL will be reduced. A direct-lit LED backlight source uses multiple pieces (for example, a certain type of 46-inch LCD TV uses about 1500 white LEDs), and the pieces are arranged in an array, each LED can be theoretically considered as a small unit for local control, and therefore is very advantageous for implementing the local dimming technique.

However, there still exist some drawbacks for the direct-lit LED backlight source to implement the local dimming. The main reason is that, in the LED backlight source, the LED array is arranged directly under an LCD glass to provide the light source to the LCD glass, so as to accomplish the dimming of each section. However, such a manner needs a great amount of LEDs, the power consumption is high, and the thickness is thicker. A subsequently developed LED edge-lit technique also has problems that the local dimming controlled sections are fewer since the local dimming of fewer sections can be achieved by only two light bars. In addition, the lights of the sections will be influenced by each other. The liquid crystal displaying quality will be affected to some extent.

Therefore, it is necessary to provide a liquid crystal display module with an improved local dimming effect to solve the existing problems of the current technique.

SUMMARY OF THE INVENTION

A primary objective of the present invention is to provide a liquid crystal display module, which achieves local dimming. The liquid crystal display module uses a multi-level light guide plate of a novel structure to effectively improve double effects of local dimming and sub-local dimming.

A secondary objective of the present invention is to provide a liquid crystal display module, which achieves local dimming. The liquid crystal display uses overlap portions of the multi-level light guide plate to from a mixed-light region so as to provide an effect of advance and even mixed-light to a lower level of the light guide plate.

A further objective of the present invention is to provide a multi-level light guide plate, which can achieve local dimming and is used in the above liquid crystal display module.

To achieve the above invention objectives, a technical solution disclosed in the present invention is as follows:

A multi-level light guide plate for achieving local dimming in a liquid crystal display module, wherein said multi-level light guide plate is divided into multiple sections sequentially connected with each other in a direction, and at least one light bar is disposed at an outward side of each section of said multiple sections; wherein sections relatively located in a middle position of said multi-level light guide plate and the light bars thereof are on a relative lower level, while sections relatively located at outward sides of said multi-level light guide plate and the light bars thereof are on another relatively higher level.

In one embodiment of the present invention, a reflective film or reflective coating is provided between each two adjacent sections.

In one embodiment of the present invention, two adjacent sections located on different levels have a portion where they overlap with each other so that the relatively lower section defines a mixed-light region in the overlapping portion.

In one embodiment of the present invention, the sections relatively located in the middle position and the sections relatively located at the outward sides have the same thickness.

In one embodiment of the present invention, the sections relatively located in the middle position have a relatively higher thickness, and the sections relatively located at the outward sides have a relatively lower thickness.

In one embodiment of the present invention, each of the sections relatively located in the middle position has a shoulder to bear and link one of the sections relatively located at the outward sides.

In one embodiment of the present invention, the section relatively located in the middle position and the section relatively located at the outward side have reflective films or reflective coating at the position of the shoulder.

In one embodiment of the present invention, a bottom surface of any section of the multiple sections has a plurality of grooves in parallel to further divide the section into multiple sub-sections; wherein an extending direction of said grooves is perpendicular to a disposing direction of the light bar of the section.

In one embodiment of the present invention, the groove has a reflective film or reflective coating on an inner wall thereof.

In one embodiment of the present invention, each light bar comprises multiple LEDs.

A liquid crystal display module comprises a liquid crystal panel and a back plate, the liquid crystal display module further comprises a multi-level light guide plate located between the liquid crystal panel and the back plate; and said multi-level light guide plate is divided into multiple sections sequentially connected with each other in a direction, and at least one light bar is disposed at an outward side of each section of said multiple sections; wherein sections relatively located in a middle position of said multi-level light guide plate and the light bars thereof are on a relative lower level, while sections relatively located at outward sides of said multi-level light guide plate and the light bars thereof are on another relatively higher level.

In one embodiment of the present invention, said back plate is a ladder-like back plate which matches a bottom surface said multi-level light guide plate for bearing the multiple sections relatively located in the middle position and outward sides of the multi-level light guide plate.

The multi-level light guide plate provided by the present invention achieves local dimming for multiple sections and ensures that the light rays of the respective sections will not influence each other by a novel structural solution collocating with the LED edge-lit feature. By utilizing the multi-level light guide plate in the liquid crystal display module, the liquid crystal displaying picture quality can be effectively lifted, the whole power consumption of the displaying device can be reduced, and the structural assembling can be more easily achieved.

DETAILED DESCRIPTION OF THE INVENTION

To make the forgoing objectives, features, and advantages more manifest and understandable, preferred embodiments of the present invention will be described in detail in conjunction with the appending drawings. Further, the directional terms described in the present invention such as "above", "under", "front", "rear", "left", "right", "inward", "outward", "side" or the like only indicate the directions with reference to the drawings. Thus, those directional terms are only used for describing and understanding the present invention rather than limiting the present invention.

The core technology of the present invention is to use an improved design of a structure of a multi-level light guide plate (LGP), in coordination with the light incident characteristics of edge LEDs, to achieve individual local dimming for multiple sections, and to ensure that lights of the respective sections will not influence each other, and thereby effectively lifting the liquid crystal displaying picture quality.

A liquid crystal display (LCD) module can be considered as an assembly of a liquid crystal panel and a backlight component. For a typical LCD module, it mainly includes the following components: a back plate, a reflector film, a backlight component, a light guide plate (also called an optical film), a liquid crystal panel and a front frame. In the LCD module manufacturing process, the back plate, the reflector film, the backlight component, the light guide plate (LGP), the liquid crystal panel and a front frame are assembled together as a whole. Amongst, the LGP is located between the back plate and the liquid crystal panel and exhibits significant and direct influence on the liquid crystal displaying picture quality.

The LGP in a current LCD module is generally single leveled. The LGP provided in the present invention is two-level or multi-level structure so that distributed light guidance for multiple sections can be accomplished. The structural improvement of the multi-level LGP will be described in detail as follows.

Figure 1:
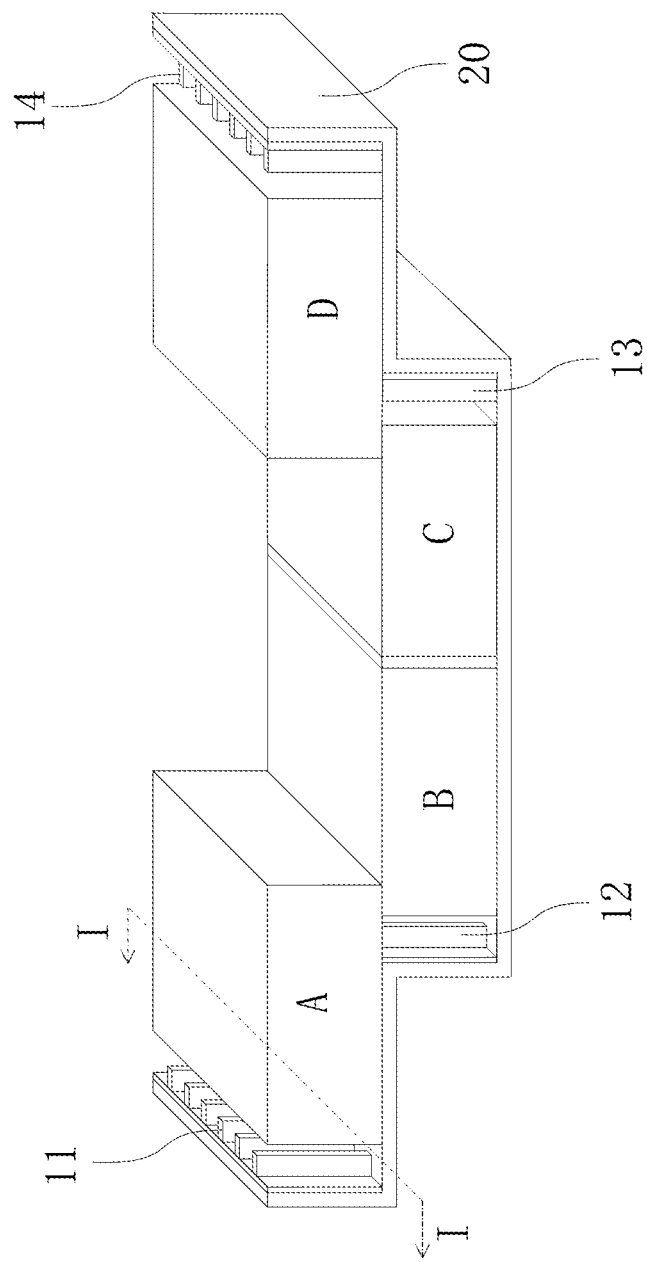
FIG. 1 is a schematic diagram showing a perspective structure of a multi-level light guide plate provided by the present invention.

As shown in FIG. 1, in the present invention, the multi-level LGP is divided into four sections A, B, C, D, which are connected with each other sequentially in one direction and symmetrically disposed. Among the four sections, the sections B and C located in middle position of the multi-level LGP are on the same relatively lower level, while the sections A and D located at the two sides (outward sides) are on another relatively higher level. Furthermore, the lower level of the LGP has mixed-light regions, which are resulted from overlap portions of the LGP, between the adjacent sections on different levels. Specifically, the portions of the sections A and B of the LGP connected with each other overlap, so that a mixed-light region B1 is formed in the section B. In the meanwhile, the portions of the sections C and D of the LGP connected with each other overlap, so that a mixed-light region C1 is formed in the section C. The function of the mixed-light region will be further described later. It is noted that, in the embodiment shown in FIG. 1, the sections A, B, C, D are disposed symmetrically. However, in other embodiments, the four sections can be disposed asymmetrically. That is, the numbers of the sections on the lower level and higher level of the LGP disposed at the two sides can be different.

In this LCD module, four light bars 11, 12, 13 and 14 are used to implement the light emitting control. Amongst, the light bar 11 controls the light emission of the section A, the light bar 12 controls the light emission of the section B, the light bar 13 controls the light emission of the section C, the light bar 14 controls the light emission of the section D. These light bars 11 to 14 serve as backlight sources, and each comprises multiple LEDs connected in series. The sections B and C relatively located in the middle position of the multi-level LGP and the light bars 12, 13 thereof are on the same lower level, while the sections A and D relatively located at the two sides (outward sides) of the multi-level LGP and the light bars thereof are on the higher level. Using LEDs as the backlight sources of the LCD module and constituting them into light bars are normal technical solutions which can be handled by ordinary persons skilled in this art, and therefore the detailed descriptions are omitted herein.

Figure 2:
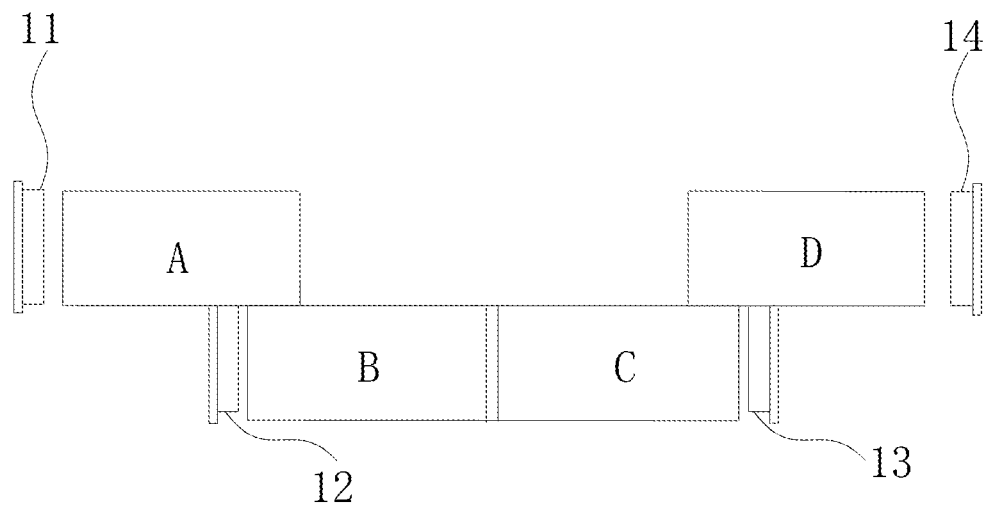
FIG. 2 is a sectional schematic diagram of the multi-level light guide plate shown in FIG. 1.

FIG. 2 is a sectional schematic of the multi-level light guide plate shown in FIG. 1. In the embodiment shown in FIG. 2, the light bar 11 is located at the left outward side of the LGP section A, the light bar 12 is located at the left outward side of the LGP section B, the light bar 13 is located at the right outward side of the LGP section C, the light bar 14 is located at the right outward side of the LGP section D, since LED edge-lit manner is adopted. The whole multi-level LGP (including the light bars implementing edge-lit) preferably constitutes a symmetrical structure.

Figure 3:
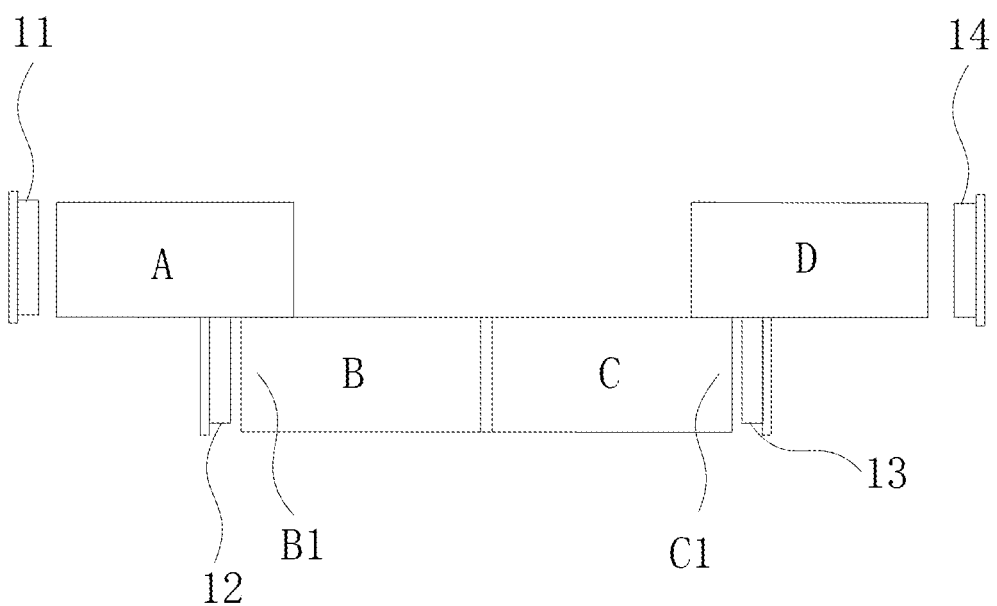
FIG. 3 is a schematic diagram showing two mixed-light regions of the multi-level light guide plate.

As shown in FIG. 3, an overlap region, which is the mixed-light region B1 of the LGP section B exists between the sections A and B of the LGP so that the sections A and B form a continuous plane light source while can be individually controlled. Similarly, there is also an overlap region, which is the mixed-light region C1 of the LGP section C, existing between the sections C and D. In the mixed-light region, a bottom surface and an inward side surface of the section A are isolated by a reflective film or reflective coating to avoid that the light rays from the light bar 12 enter into the section A. Similarly, a bottom surface and an inward side surface of the section D are isolated by a reflective film or reflective coating. Further, a reflective film or reflective coating can be provided at a junction between the section B and C to separate them from each other. Bottom surfaces of the sections B and C can be provided with reflective films or reflective coating or not. By doing so, the light rays from the light bar 12 can be reflected to an even degree in the mixed-light region B1 and then be outwardly emitted from a top surface of the LGP section B. Similarly, the light rays from the light bar 13 can be reflected to an even degree in the mixed-light region C1 and then be outwardly emitted from a top surface of the LGP section C. Therefore, the mixed-light regions B1 and C1 exhibit the effect of advance and even clutter.

Figure 4:
FIG. 4 is a schematic diagram showing a sectional shape taken along a line I-I of the multi-level light guide plate shown in FIG. 1.

Further, in order to prevent the lights in the same LGP section A from influencing each other, promote the brightness uniformity and/or local controllability of the section A, and make sure that the section A is an integral LGP, the section A of the multi-level LGP can be further formed to have a sectional shape as shown in FIG. 4. That is, parallel grooves A0 are provided on the bottom surface of the section A with a certain pitch to divide the section A into multiple sub-sections A1, A2, A3, ..., AN (N is a nature number). The groove A0 extends in a direction substantially perpendicular to the direction in which the light bar 11 is disposed, that is, parallel to the light rays emitted from the light bar 11. As shown in FIG. 4, an edge light incident side (i.e. the left outward side) of the sub-section A1 corresponds to a portion of the LEDs connected in series in the light bar 11, so the brightness of the section A1 can be individually controlled. An edge light incident side of the sub-section A2 corresponds to another portion of the LEDs connected in series in the light bar 11, so the brightness of the section A2 can be individually controlled. The rest of the sub-sections can be deduced accordingly. In this way, individual luminance control of the respective sub-sections A1, A2, A3, ..., AN is further achieved through N sets of LEDs connected in series in the light bar 11.

To prevent the light rays of the sub-section A1 from entering into the sub-section A2, a reflective film can be adhered on the inner wall of the groove A0 (i.e. the notch structure) at the interface between the sub-section A1 and the sub-section A2. Similarly, a reflective film can be adhered on the inner wall of the groove A0 (i.e. the notch structure) at the interface between the sub-section A2 and the sub-section A3 to prevent the light rays of the sub-section A2 from entering into the sub-section A1 or A3. By such a structural design, the sub-section A1 to the sub-section AN can be independent from each other without influencing each other.

The above structural solution is also suitable for the section B of the multi-level LGP, and thereby the sub-section B1 to the sub-section BN (N is a nature number) can be independent from each other without influencing each other. Similar solution can be used on the LGP structural design of the sections C and D, the grooves extend in a direction substantially perpendicular to the direction in which the light bars of the respective sections are disposed, that is, parallel to the light rays emitted from the light bars of the respective sections. Preferably, a reflective film is adhered on the inner wall of the groove (i.e. the notch structure) at the interface between the sub-sections, and the detailed description is omitted herein. In this way, the LCD module which is edge-lit and has double effects of individual local dimming for the respective sections and local dimming of the sub-sections is achieved.

Figure 5:
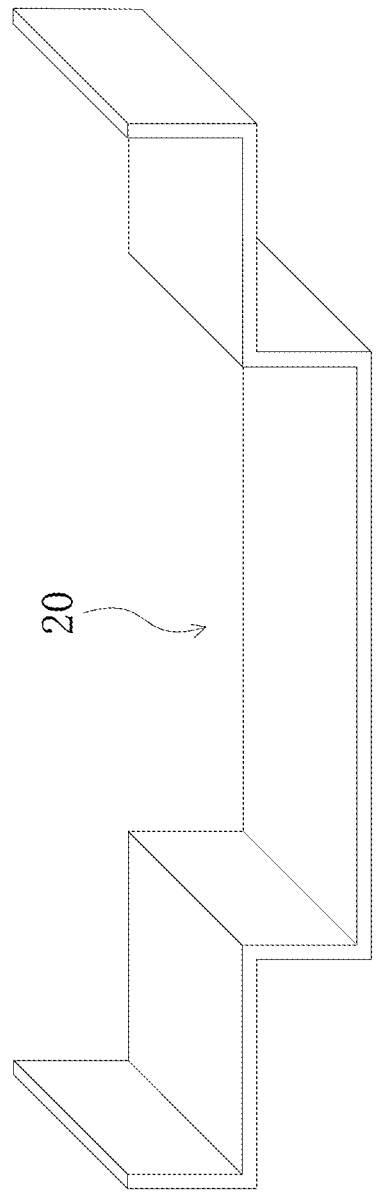
FIG. 5 is a schematic diagram showing an assembled state of a ladder-like back plate and the multi-level light guide plate.

In the manufacturing process of an LCD module, a LGP is usually made planar so that it is convenient for assembling operation. However, for the multi-level LGP provided by the present invention, the four sections A to D are not on the same plane, and therefore bringing a certain degree of difficulty to the assembling operation. To solve such a problem, as shown in FIGS. 1 and 5, a ladder-like back plate 20 can be made. The ladder-like back plate 20 can collocate with a mold frame (not shown). In this way, the four sections A to D of the multi-level LGP can be easily mounted and fixed.

Figure 6:
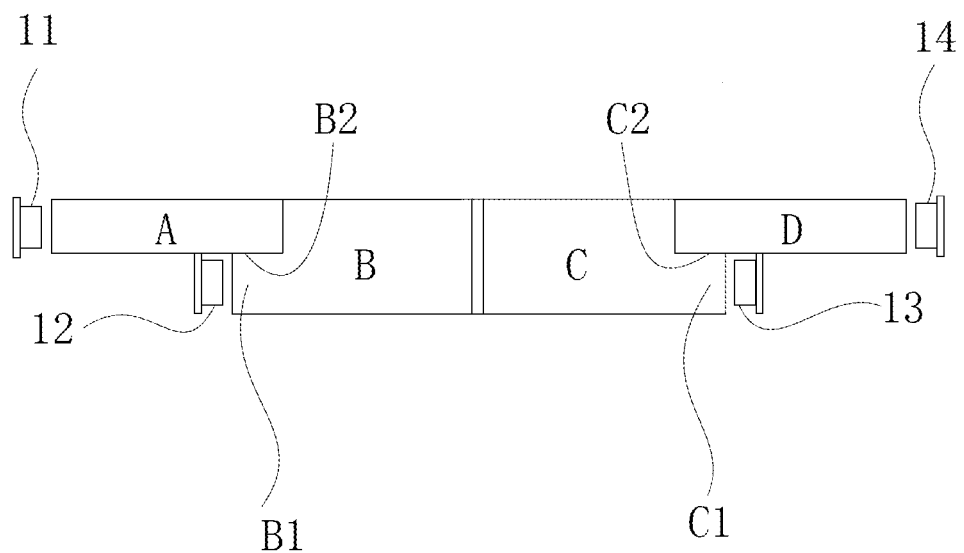
FIG. 6 is a sectional schematic diagram of a multi-level light guide plate of another embodiment.

Another solution of the present invention is to change the shape of the multi-level LGP. As shown in FIG. 6, the thickness of the inner LGP sections B and C can be directly increased so that their top surfaces are one the same plane with the top surfaces of the sections A and D and are flush with each other, thereby the shape of the multi-level LGP changes from a U shape to a general T shape. In the meanwhile, the inner LGP sections B and C are recessed to form shoulders B2, C2, respectively. The shoulders B2, C2 can be used to bear a right inner end of the outer LGP section A and a left inner end of the outer LGP section D, respectively.

Furthermore, to make the LGP sections A and B form a continuous plane light source while still can be respectively and individually controlled, there is also an overlap region (i.e. a portion of the LGP below the shoulder B2), which is a mixed-light region B1 of the section B, between the sections A and B. Similarly, there is also an overlap region (i.e. a portion of the LGP below the shoulder C2), which is a mixed-light region C1 of the section C, between the sections C and D. In the mixed-light region, in order to make sure that the light rays of the light bar 12 will not enter into the section A, a reflective film or reflective coating is provided on the bottom surface and the inner surface of the section A at the side without the light bar disposed or on the surface of the shoulder B2. Similarly, a reflective film or reflective coating is provided on the bottom surface and the inner surface of the section D at the side without the light bar disposed or the surface of the shoulder C2. A reflective film or reflective coating can be provided at a junction between the section B and C to separate them from each other. Bottom surfaces of the sections B and C can be provided with reflective films or reflective coating or not. The mixed-light regions B1 and C1 shown in FIG. 6 exhibit the same effect of advance and even mixed-light as the mixed-light regions B1 and C1 shown in FIGS. 1 to 3.

The change of shape shown in FIG. 6 makes the multi-level LGP easier to be fixed. It is noted that the sections A, B, C, D of the multi-level LGP of the solution shown in FIG. 6 can still adopt the structural design shown in FIG. 4 so as to achieve the individual light output and control for each section.

As described above, the present invention provides a multi-level LGP, which achieves local dimming for multiple sections or local dimming for sub-sections of the same section and therefore having the double local dimming effect, and ensures that the light rays of the respective sections will not influence each other through a novel structural solution collocating with the LED edge-lit feature. By utilizing the multi-level LGP in the LCD module, the liquid crystal displaying picture quality can be effectively lifted, the whole power consumption of the displaying device can be reduced, and the structural assembling can be more easily achieved.

The present invention has been disclosed by describing the preferred embodiments, however, the above embodiments are only the examples for implementing the present invention. It must be pointed out that the disclosed embodiments do not limit the scope of the present invention. To the contrary, modifications and equivalent alterations embraced in the spirit and scope of the claims should all be included in the scope of the present invention.

What is claimed is:

1. A liquid crystal display module comprising a liquid crystal panel and a back plate, characterized in that:

said liquid crystal display module comprises a multi-level light guide plate located between the liquid crystal panel and the back plate;

said multi-level light guide plate is divided into multiple sections sequentially connected with each other in a direction, and at least one light bar is disposed at an outward side of each section of said multiple sections; and a bottom surface of any section of the multiple sections has a plurality of grooves parallel to each other, which further divide the section into multiple sub-sections, an edge light incident side of each sub-section corresponds to a portion of LEDs connected in series in the light bar and a reflective film or reflective coating is adhered on a wall of each of the grooves at an interface between every two sub-sections to prevent light rays of one sub-section from entering another so that brightness of the sub-sections is individually controlled, said grooves extending in a direction perpendicular to a direction that the light bar of the section is disposed, wherein sections relatively located in a middle position of said multi-level light guide plate and the light bars thereof are on a relatively lower level, while sections relatively located at outward sides of said multi-level light guide plate and the light bars thereof are on another relatively higher level; and wherein said back plate is a ladder-like back plate which matches a bottom surface of said multi-level light guide plate for bearing the multiple sections relatively located in the middle position and outward sides of the multi-level light guide plate; a reflective film or reflective coating is provided between each two adjacent sections; two adjacent sections located on different levels have a portion where they overlap with each other so that the relatively lower section defines a mixed-light region in the overlapping portion.

2. A liquid crystal display module comprising a liquid crystal panel and a back plate, characterized in that:

said liquid crystal display module comprises a multi-level light guide plate located between the liquid crystal panel and the back plate;

said multi-level light guide plate is divided into multiple sections sequentially connected with each other in a direction, and at least one light bar is disposed at an outward side of each section of said multiple sections; and a bottom surface of any section of the multiple sections has a plurality of grooves parallel to each other, which further divide the section into multiple sub-sections, an edge light incident side of each sub-section corresponds to a portion of LEDs connected in series in the light bar and a reflective film or reflective coating is adhered on a wall of each of the grooves at an interface between every two sub-sections to prevent light rays of one sub-section from entering another so that brightness of the sub-sections is individually controlled, said grooves extending in a direction perpendicular to a direction that the light bar of the section is disposed, wherein sections relatively located in a middle position of said multi-level light guide plate and the light bars thereof are on a relative lower level, while sections relatively located at outward sides of said multi-level light guide plate and the light bars thereof are on another relatively higher level.

3. The liquid crystal display module as claimed in claim 2, characterized in that: said back plate is a ladder-like back plate which matches a bottom surface of said multi-level light guide plate for bearing the multiple sections relatively located in the middle position and outward sides of the multi-level light guide plate.

4. The liquid crystal display module as claimed in claim 2, characterized in that: a reflective film or reflective coating is provided between each two adjacent sections.

5. The liquid crystal display module as claimed in claim 2, characterized in that: two adjacent sections located on different levels have a portion where they overlap with each other so that the relatively lower section defines a mixed-light region in the overlapping portion.

6. The liquid crystal display module as claimed in claim 2, characterized in that: the sections relatively located in the middle position and the sections relatively located at the outward sides have the same thickness.

7. The liquid crystal display module as claimed in claim 2, characterized in that: the sections relatively located in the middle position have a relatively higher thickness, and the sections relatively located at the outward sides have a relatively lower thickness.

8. The liquid crystal display module as claimed in claim 7, characterized in that: each of the sections relatively located in the middle position has a shoulder to bear and link one of the sections relatively located at the outward sides.

9. The liquid crystal display module as claimed in claim 8, characterized in that: the section relatively located in the middle position and the section relatively located at the outward side have reflective films or reflective coating at the position of the shoulder.

10. A multi-level light guide plate for achieving local dimming in a liquid crystal display module, characterized in that:

said multi-level light guide plate is divided into multiple sections sequentially connected with each other in a direction, and at least one light bar is disposed at an outward side of each section of said multiple sections; and a bottom surface of any section of the multiple sections has a plurality of grooves parallel to each other, which further divide the section into multiple sub-sections, an edge light incident side of each sub-section corresponds to a portion of LEDs connected in series in the light bar and a reflective film or reflective coating is adhered on a wall of each of the grooves at an interface between every two sub-sections to prevent light rays of one sub-section from entering another so that brightness of the sub-sections is individually controlled, said grooves extending in a direction perpendicular to a direction that the light bar of the section is disposed, wherein sections relatively located in a middle position of said multi-level light guide plate and the light bars thereof are on a relative lower level, while sections relatively located at outward sides of said multi-level light guide plate and the light bars thereof are on another relatively higher level.

11. The multi-level light guide plate as claimed in claim 10, characterized in that: a reflective film or reflective coating is provided between each two adjacent sections.

12. The multi-level light guide plate as claimed in claim 10, characterized in that: two adjacent sections located on different levels have a portion where they overlap with each other so that the relatively lower section defines a mixed-light region in the overlapping portion.

13. The multi-level light guide plate as claimed in claim 10, characterized in that: the sections relatively located in the middle position and the sections relatively located at the outward sides have the same thickness.

14. The multi-level light guide plate as claimed in claim 10, characterized in that: the sections relatively located in the middle position have a relatively higher thickness, and the sections relatively located at the outward sides have a relatively lower thickness.

15. The multi-level light guide plate as claimed in claim 14, characterized in that: each of the sections relatively located in the middle position has a shoulder to bear and link one of the sections relatively located at the outward sides.

16. The multi-level light guide plate as claimed in claim 15, characterized in that: the section relatively located in the middle position and the section relatively located at the outward side have reflective films or reflective coating at the position of the shoulder.

\* \* \* \* \*